United States Patent [19]

Benedikt et al.

[11] 4,416,228

[45] Nov. 22, 1983

[54] SEPARATELY IGNITED INTERNAL COMBUSTION ENGINE WITH AT LEAST ONE MAIN COMBUSTION CHAMBER AND AN IGNITION CHAMBER

[75] Inventors: Walter Benedikt, Stuttgart; Reinhard Latsch, Vaihingen; Hans Schlembach, Mühlacker, all of Fed. Rep. of Germany

[73] Assignee: Robert Bosch GmbH, Stuttgart, Fed. Rep. of Germany

[21] Appl. No.: 337,855

[22] Filed: Jan. 7, 1982

[30] Foreign Application Priority Data

Jan. 17, 1981 [DE] Fed. Rep. of Germany ....... 3101326
Dec. 5, 1981 [DE] Fed. Rep. of Germany ....... 3148296

[51] Int. Cl.³ .......................... F02P 1/00; F02B 3/00
[52] U.S. Cl. ........................ 123/268; 123/169 EL; 123/254; 123/260; 123/266; 123/293; 313/141
[58] Field of Search .............. 313/141; 123/254, 266, 123/268, 260, 293, 169 EL, 169 V, 143 B

[56] References Cited

U.S. PATENT DOCUMENTS

| | | | |
|---|---|---|---|
| 4,112,905 | 9/1978 | Stockel et al. | 123/169 EL |
| 4,218,993 | 8/1980 | Blackburn | 123/143 B |
| 4,219,003 | 8/1980 | Sato et al. | 123/169 EL |

*Primary Examiner*—Ronald B. Cox
*Attorney, Agent, or Firm*—Michael J. Striker

[57] ABSTRACT

An ignition chamber unit to be arranged on a main combustion chamber of an internal combustion engine has walls forming a separate ignition chamber having a first wall which separates the ignition chamber from the main combustion chamber and has at least one passage arranged in the first wall to connect the ignition chamber with the combustion chamber, a center electrode provided in the ignition chamber and forming together with the first wall a spark gap and also having a free end which extends into the ignition chamber, wherein the electrode is hollow near the free end and is formed as a heat pipe, and an insulator with an insulator shoe which extends into the ignition chamber and supports the center electrode so that the insulator together with the insulator shoe forms an insulating gap.

42 Claims, 10 Drawing Figures

SEPARATELY IGNITED INTERNAL COMBUSTION ENGINE WITH AT LEAST ONE MAIN COMBUSTION CHAMBER AND AN IGNITION CHAMBER

BACKGROUND OF THE INVENTION

The present invention relates to an internal combustion engine with at least one main combustion chamber and an ignition chamber connected therewith.

Internal combustion engines of this general type are known in the art, for example from the German patent application No. P 3,025,926.8. The internal combustion engine disclosed in this reference has a center electrode which extends from its free end forming a spark gap into the ignition chamber. Heat of the center electrode must be withdrawn so as to prevent the center electrode from attaining unacceptably high temperatures which can result in uncontrolled or surface ignition. The withdrawal of heat is performed with the aid of an insulator shoe which is formed on the insulator and surrounds the center electrode at least over a half of its longitudinal portion extending into the ignition chamber. The insulator shoe transfers the heat quantities which are received from the center electrode and can lead to the unacceptably high temperatures, to the insulator. Since the insulator shoe is also exposed to hot combustion gases, it has a great cross-section in the region directly adjacent to the insulator. It is thereby provided at the part of the ignition chamber which extends arround the center electrode, has a greater diameter than the part of the ignition chamber which extends between the main combustion chamber and the spark gap. Thereby, a chamber is available behind the spark gap for receiving residual gases of a predetermined combustion. By the time of ignition, sufficiently combustible mixture is located in the spark gap. It is desirable to increase the gas-receiving possibilities of this part of the ignition chamber, which extends around the center electrode. However, often the diameter of the chamber for the provision of the ignition chamber so that the inner cross-section of the ignition chamber is limited so that the inner cross-elongation of the ignition chamber has the disadvantage that for avoiding an unacceptable temperature increase on the center electrode and the insulation shoe, at least the latter must have a great cross-section. The great cross-section of the insulating shoe so narrows the inner cross-section of the ignition chamber that the intended increase of the ignition chamber can be attained only partially or not attained at all.

SUMMARY OF THE INVENTION

Accordingly, it is an object of the present invention to provide an internal combustion engine which has a greater inner cross-section of the ignition chamber in the region around the center electrode.

Another object of the present invention is to provide an internal combustion engine in which the ignition chamber has at least one tangential passage for attaining a whirling movement of a fuel-air mixture to be ignited, so that the increased distance between the center electrode and the adjacent wall of the ignition chamber breaks the whirling mixture to a smaller extent. Thereby the whirling movement must have a small speed at the beginning, and it can be attained with small energy consumption.

Furthermore, it is also an object of the present invention to form the insulator shoe very thin, since quantities of heat received by the insulator shoe after attaining the predetermined temperature can be withdrawn by it via the center electrode.

Still another feature of the present invention is to provide a center electrode which does not have a danger of an uncontrolled or surface ignition, and at the same time the temperature of the insulator shoe lies in advantageous manner in the region of the so-called free combustion temperature. The free combustion temperature is attained fast, misigniting which can take place because of leakage flow is thereby counteracted, and the insulator shoe can be formed relatively short.

In keeping with these objects, and with others which will become apparent hereinafter, one feature of the present invention resides, briefly stated, in an internal combustion engine or an ignition chamber which has a first wall separating the ignition chamber from the combustion chamber and connected with the latter by at least one passage in the first wall, a center electrode provided in the ignition chamber and forming together with the wall a spark gap, wherein the center electrode has a free end which extends into the ignition chamber and is hollow near the free end and formed as a heat pipe, and an insulator with an insulator shoe extends into the ignition chamber and supports the center electrode so that the insulator together with the insulator shoe forms an insulating gap.

When the internal combustion engine or the ignition chamber is designed in accordance with these features, all objects listed above are attained.

In accordance with another feature of the present invention, the electrode has a first portion which is formed as a heat pipe and a second portion extending in direction of the axis of the spark gap and adjacent to the latter, wherein the second portion of the electrode has a narrower cross-section than the first portion. When these features are provided, a good admittance of the fuel-air mixture to be ignited to the spark gap and a small cooling of already ignited quantities of the mixture are attained.

Further features of the present invention are that the center electrode is straight and substantially concentric with the insulator, and the spark gap extends substantially transverse to the longitudinal axis of the ignition chamber, wherein the center electrode is wedge-shaped in direction toward the spark gap. The center electrode may have one portion arranged substantially coaxially in the insulator, and another portion which is bent toward the spark gap. The center electrode may have an end portion reducing in a conical manner. The electrode may also have an end surface which is formed as an arch of substantially semicircular shape. These features provide for especially advantageous construction of the reduced cross-section.

The same purposes are attained when the electrode has an end portion which is offset in direction of its axis toward the insulator and also relative to a counterelectrode. The center electrode may have an end surface facing towards the spark gap and having a spherical shape. These features can be utilized with center electrodes which are different from those described hereinbelow in the beginning.

The counterelectrode which is associated with the center electrode may be formed as a nose-shaped projection which extends into the ignition chamber, or as a pin-shaped formation. In this case, the fuel-air mixture to be ignited has good access to the spark gap, and after the ignition by the electrode is not unnecessarily cooled by the latter. The wall of the ignition chamber may have a sealing surface and a thread to be screwed into the main combustion chamber, so that the ignition chamber is formed as a spark plug. In this case the ignition chamber can be inserted into the internal combustion engine in a very simple way.

The thread in a region adjacent to the main combustion chamber may have a pitch which is insignificantly smaller than the thread in the region adjacent to the sealing surface. This provides for a good heat transfer along the entire length of the thread when the ignition chamber is screwed into an internal combustion engine.

The wall of the ignition chamber may have a cylindrical neck located between the sealing face and the thread and having a length substantially corresponding to the length of the thread. Thereby the ignition chamber in the region which faces toward the main combustion chamber and is subjected to high temperatures is cooled particularly efficiently.

The neck of the ignition chamber may have such a dimension that in cold condition there is a small distance between the neck and a wall of the engine, the distance takes place during increase of temperature in the ignition chamber, and upon attaining the working temperature the neck abuts against the wall of the combustion engine. This provides for control of the temperature of the ignition chamber in the region around the center electrode.

A further temperature control is attained when the ignition chamber has a wall which is elastically expansible so that when identical pressure prevails inside and outside of the ignition chamber there is a distance between the outer surface of the expansible wall and the engine, and when a negative pressure develops inside the ignition chamber the expansible wall abuts with its outer surface against the engine wall. The expansible wall may be provided in some zones of the ignition chamber. At least one slot may be provided in the elastically expansible wall.

The above mentioned features starting from the thread with different pitch in different regions can be provided regardless of the construction of the center electrode.

An expander ring may be arranged inside the ignition chamber so as to expand the wall of the latter relative to the engine wall. The thus designed ignition chamber is expanded simultaneously by the load-dependent negative pressure and by load-dependent thermal expansion. Thereby the wall of the ignition chamber arrives faster and stronger at a heat-conductive contact with the cooled engine. This provides for an advantage in that the temperature range in which the working temperature of the ignition chamber changes because of different loads on the machine is narrower. Thereby the lower limit of this temperature range can be increased without uncontrolled ignition. This improves the ignition susceptibility of a fuel-air mixture during only partial loading of the engine and in idle running.

The expander ring may be composed of material having a thermal expansion coefficient which is greater than the thermal expansion coefficient of the expansible wall. The expander ring may also have a peripheral surface facing toward the expansible wall and being smaller than the height thereof. This feature provides for further narrowing of the working temperature range of the ignition chamber. These features can be used singly or in combination with one another. The joint utilization of these features reduces the temperature range in an especially considerable extent, so that the lower limit of this temperature range can be more raised without causing uncontrolled ignition.

The expander ring may be formed as a ground electrode. This is especially advantageous inasmuch as the expander ring and the ground electrode are formed as a single structural part.

The expander ring may be inserted into the ignition chamber and secured against axial displacement. This feature provides for a favorable structural form, in the sense of manufacturing technique.

Still a further feature of the present invention is that, instead of an expander ring, an expander pipe is provided. The expander pipe forms a wall portion of the lower part of the ignition chamber and also a wall portion inside the upper part of the ignition chamber. These wall portions are heated during starting of the engine very fast to a desired temperature, since by attaining these temperatures heat is transmitted substantially only via the mounting parts whose height and surface are very small as compared with the length and the surface of the expander pipe exposed to the frames. Thereby after the start of the engine such active preparation of fuel-air mixture is attained that the conventional starting enrichment can be finished earlier compared to what is customary. Correspondingly, the time is reduced during which the great part of the fuel remains unused in the engine and is released to the surrounding atmosphere.

The elastically expansible part of the threaded neck may have at least one expansion slot. The elastically expandable part may have a plurality of such slots which are provided in planes extending in the longitudinal axis of the threaded neck, and starting from the free end of the threaded neck and finishing in thin-walled zones of the threaded neck, formed as elastic hinges. At least one collar may be provided at the height of the free end of the threaded neck between the latter and the expander pipe and arranged so that during expansion of the expander pipe the collar transmits forces substantially in a radial direction to the threaded neck. A further collar may be arranged between the free end of the threaded neck and the open end of the expander pipe, so that the expander pipe is supported by the threaded neck via the further collar. The threaded member may be connected with the expander pipe by welding or soldering. An especially disturbance-free and fast inflammation of the fuel-air mixture is attained when the free end portion of the expander pipe extends freely into the ignition chamber and forms a ground electrode. The above mentioned features, starting from the provision of the expander pipe, can be used with a center electrode formed as described in the beginning, i.e. formed as a heat pipe, or also with other center electrodes.

Finally, the first wall of the ignition chamber may have a plurality of passages, some of the passages may extend substantially tangentially and in an identical angular direction relative to the expander pipe, the ground electrodes formed by the free end of the expander pipe may face towards the insulator, the expander pipe may have a recess provided behind the passages as considered in the angular direction, the center electrode may be bendable relative to the ground electrode, and the threaded neck of the ignition chamber may have at least one opening provided at the height of the recess facing towards the electrodes.

When the ignition chamber is designed in accordance with these features, there is the advantage that, after the ignition by the electrode, the mixture can form flames which expand in free and undistubed manner, the part of non-combusted fuel in the exhaust gas is smaller, and the center electrode is accessible for subsequent adjustments of the length of the spark gap when the free end of the center electrode ends inside the contour of the expander pipe forming the ground electrode. The formation of the ground electrode and the arrangement of the recess following the same and the openings in the threaded neck can also be transmitted in ignition chambers which have small temperature adjustment arrangements. Through the openings, the length of the ignition gap may be corrected many times with time intervals, so that an increased service life of the ignition chamber results.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
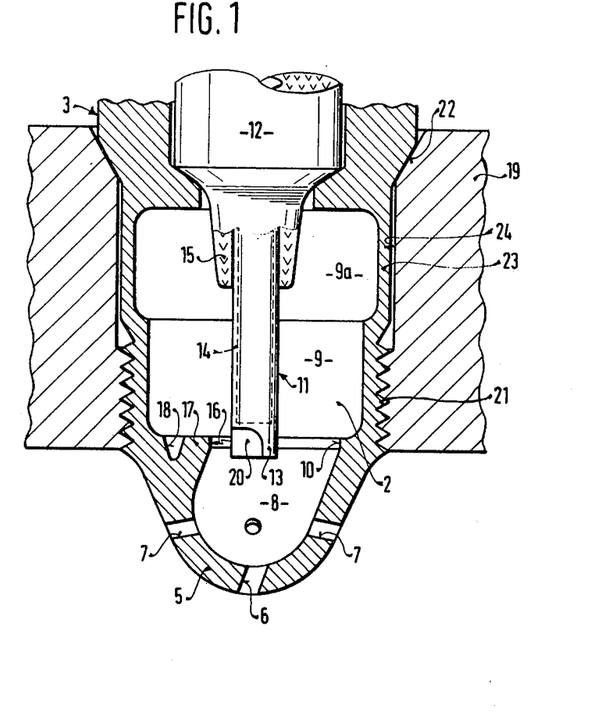
FIG. 1 is a view showing an ignition chamber in accordance with one embodiment of the present invention.

An ignition chamber 2 of an internal combustion engine in accordance with the present invention is provided in a threaded socket 3 carrying a hexagonal wrench insert 4. The threaded socket 3 has a wall 5 which is curved and extends into a not shown main combustion chamber of the internal combustion engine.

Figure 2:
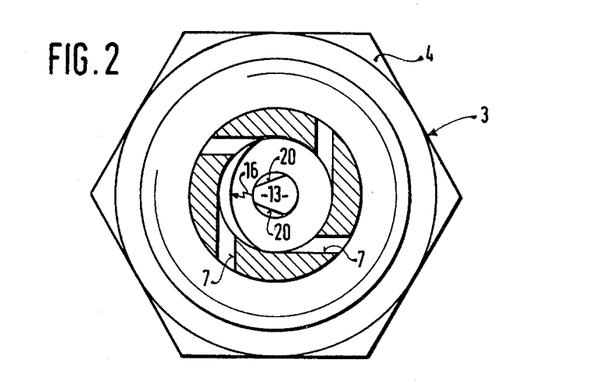
FIG. 2 is a view from below of the ignition chamber of FIG. 1.

Passages 6 and 7 communicate the main combustion chamber with the interior of the ignition chamber 2. The passage 6 extends substantially in an axial direction of the threaded socket 3, whereas the passage 7 opens substantially tangentially into the ignition chamber. Adjacent to the passages 6 and 7, the ignition chamber has a narrower part 8 on which a wider part 9 and finally a part 9a are provided. A center electrode extends advantageously coaxially with the threaded socket 3. The center electrode 11 is provided, at the height of a transition between the parts 8 and 9, with a free end 13. The center electrode 11 is carried by an insulator 12 inserted into the threaded socket 3.

The center electrode 11 is formed hollow, starting from its free end 13 in direction toward the insulator 12 and is designed as a heat pipe 14. An insulator shoe 15 is formed on the insulator 12 and surrounds the center electrode 11 concentrically. The transition 10 is eccentric relative to the center electrode 11. A narrowest point between the center electrode 11 and the transition 10 forms a spark gap 16. Adjacent to the spark gap 16, the transition 10 serves as a counterelectrode 17 for the center electrode 11. As seen from the spark gap 16, a recess 18 is formed in the threaded socket 3 behind the counterelectrode 17. The recess 18 is formed so that the counterelectrode 17 extends as a nose of the threaded socket 3 against the center electrode 11, so as to form a further wall for the ignition chamber 2. By this design of the counterelectrode 16, it is heated fast to a desired working temperature by burning gases.

A fuel-air mixture which is aspirated into the main combustion chamber of the internal combustion engine or produced in the latter is passed during a subsequent compacting stroke of the machine from the main combustion engine via the passages 6 and 7 into the part 8 of the ignition chamber and finally into the wider part 9. Because of the tangential arrangement of the passage 7, the pressed mixture obtains a whirling movement whose axis of rotation is substantially parallel to the center electrode 11. The mixture is ignited in the spark gap 16, so that it surrounds the center electrode 11 in burning condition. This burning gas heats predominantly the center electrode 11 and the counterelectrodes 17 as well as the insulator shoe 15. After a certain time of operation of the internal combustion engine, the center electrode 11 obtains a predetermined temperature. This can be retained constant with the aid of the heat pipe 14 which transmits subsequently supplied heat to the insulator 12. From there the heat is transmitted in a known manner via the threaded socket and a not shown connecting end for supplying the ignition voltage to a cylinder head 19 of the internal combustion engine and to the surrounding atmosphere. The arrangement of the heat pipe 14 makes it possible that the temperature of the center electrode is selected very high and during the operation is reliably kept below such a temperature as could cause uncontrolled or surface ignition.

Heating of the center electrode and the counterelectrode 17 results in the fact that during normal operation of the internal combustion engine, the mixture travelling in the spark gap is heated and thereby made ready for ignition. Because of this, and because of the stream in the wall close region of 16, it is possible to reliably ignite the mixture with air surplus. The heat pipe 14 conducts either heat from the center electrode 11 to the insulator shoe 15 or heat from the latter to the insulator 12. Thereby after the start of the internal combustion engine, the insulator shoe 15 is heated fast to a desired free burning temperature, and at the same time is protected against unacceptable heating which can cause uncontrolled ignition.

For preventing unnecessary cooling the ignited mixture afterwards, the cross-section of the free end 13 of the center electrode 11 is smaller than the electrode cross-section in the region of the heating pipe 14 of the insulator shoe 15. The cross-section reduction is formed by provision of two faces 20. Between these faces 20, the free end 13 has the form of a wedge facing toward the spark gap 16. The nose-like form of the counterelectrode 17 acts in the same way. The cross-section reduction provides also for an improved supply of the mixture into the spark gap 16.

The threaded socket 3 has a thread 21 at its end facing toward the main combustion chamber and is screwed with the thread into a cylinder head 19. A surface 22 which is circumferentially closed and formed as a circular ring is located between the thread 21 and the range part 4 and provided with the thread socket 3. The surface 22 is utilized for limiting the screwing depth of the ignition chamber 2 into the cylinder head 19 and sealing the main combustion chamber from the surrounding atmosphere of the internal combustion engine. Between the thread 21 and the surface 22, the threaded socket 3 is formed as a cylindrical neck 23 concentric with the thread 21. The diameter of the cylindrical neck 23 and the inner diameter of a hole 24 of the cylinder head 19 surrounding the neck 23 are so selected relative to one another, that when the engine is cooled a certain play is available. This play is so selected depending upon the material of the cylindrical neck 23 and the cylindrical head 19, that by attaining a desired working temperature of the ignition chamber this play disappears, and the cylindrical neck 23 abuts against the cylindrical head 19. This abutment provides for transmission of all heat from the neck 23 to the cylinder head 19 so that the desired working temperature of the ignition chamber is not exceeded.

In the ignition chamber in accordance with the second embodiment of the invention, a free end 13' of an electrode 11' is offset relative to a counterelectrode 17' in direction of an insulator 12'. Thereby a spark gap 16' extends between the end 13' of the center electrode 11' and the counterelectrode 17' not normal to the axis of the insulator 12', but inclined relative thereto, as can be seen from FIG. 3. This inclined arrangement of the spark plug 16' acts also for providing an improved supply stream of the fuel-air mixture to be ignited to the spark gap 16'. A further improvement is attained when the end 13' is formed semicircular and the counterelectrode 17' is rounded. A recess 18' between the counterelectrode 17' and the threaded socket 3' serves so that the counterelectrode 17' extends as a nose and after the start of the internal combustion engine can attain a desired temperature very fast.

Figure 3:
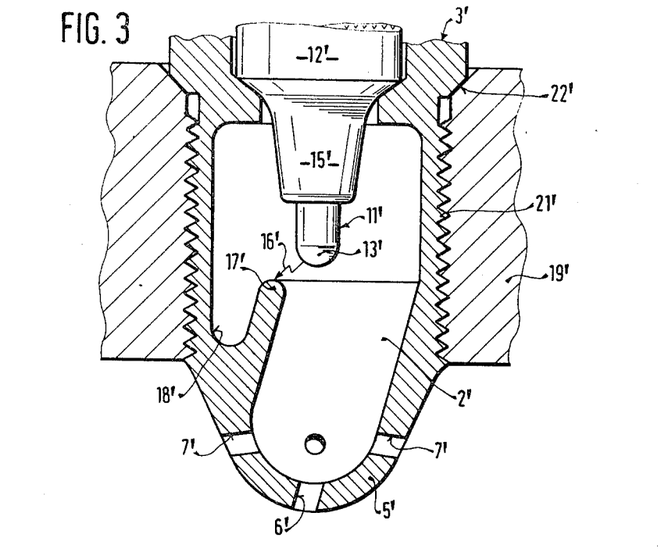
FIG. 3 is a view showing a longitudinal section of the ignition chamber in accordance with another embodiment of the invention.

The special feature of a thread 21' provided on the threaded socket 3' of the ignition chamber 2' of FIG. 3 is that at least in the region which is adjacent to the main combustion chamber, this thread 21' has an insignificantly smaller pitch than a threaded hole arranged in the cylinder head 19'. Thereby not only lies the thread course of the threaded socket 3' located closest to the insulator 12', on the thread course of the threaded hole in the cylinder head 19', but also the thread course which is located in the immediate vicinity of the main combustion engine. Via the first-mentioned thread course, the cylinder head 19' withdraws from the threaded socket 3' in the region from a wall 5' with openings 6' and 7' and extending into the main combustion engine, so much heat that the wall 5' is protected from undesirable overheating. Disadvantageous uncontrolled ignition is thereby avoided. Cooling of the center electrode 11' and the insulator shoe 15' formed on the insulator 12' is also controlled by the construction of the electrode 11' as a heat pipe.

Figure 4:
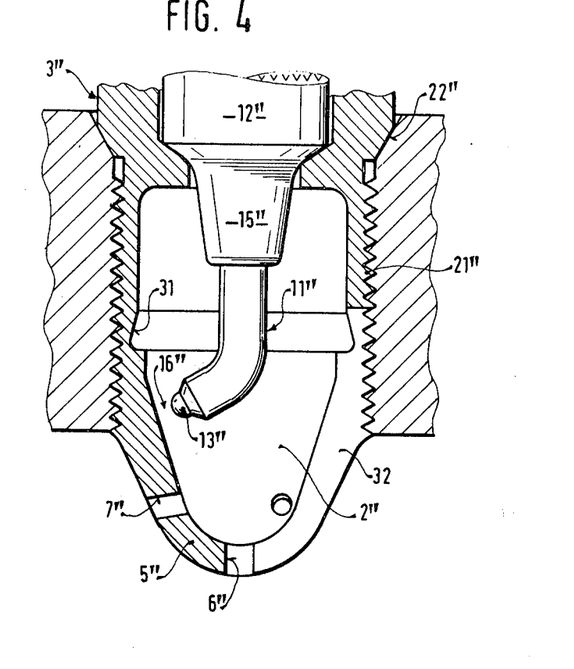
FIG. 4 is a view showing a longitudinal section of the ignition chamber in accordance with still another embodiment of the invention.
Figure 5:
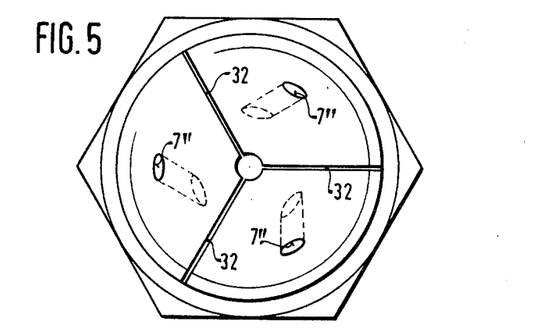
FIG. 5 is a view showing a section of the ignition chamber of FIG. 4.

In the ignition chamber in accordance with a third embodiment shown in FIGS. 4 and 5, a center electrode 11" is formed behind its free end 13" extending into an ignition chamber 2", as a heat pipe 14". The end 13" is first conical and then semicircular and extends in a direction which deviates from the axial direction of an insulator 12". Thereby the end 13" is directed against a threaded socket 3" which forms a wall of the ignition chamber 2". The threaded socket 3" serves as a counterelectrode. Between the same and the end 13" there is provided a spark gap 16". The threaded socket 3" has a thread 21" adjacent to a sealing surface 22". Substantially over half the length of the threaded socket 21", a ring-shaped recess 31 is provided in the interior of the ignition chamber 2". Starting from a wall 5" extending into the main combustion engine, the ignition chamber 2" is provided in the region of the recess 31 advantageously with three slots 32. The slots 32 extend in direction of the insulator 12" up to the ring-shaped recess 31. Between the ring-shaped recess 31 and the thread 21", the threaded socket 3" forms one or more elastic hinges.

The longitudinal portion of the thread 21" which extends between the main combustion chamber and the end of the slot 32 has a certain small play to the cylinder head 12". When the fuel-air mixture pressed from the main combustion chamber into the ignition chamber 2" is ignited and then expanded, the passages 6" and 7" provide for throttling and cause a negative pressure inside the ignition chamber 2" relative to the main combustion chamber. This negative pressure expands, after aspiration of the mixture into the internal combustion engine, the slotted part of the ignition chamber 2" elastically more or less. As soon as the negative pressure exceeds a preselected value, the thread course of the thread 21" abuts against the cylinder head 19" and transmits a part of such heat which is generated during burning of the mixture inside the ignition chamber 2". Thereby the temperature of the ignition chamber 2" is regulated in the region of the wall 5". The temperature regulation is performed in dependence upon the negative pressure in the ignition chamber 2" which depends upon the loading of the internal combustion engine.

In the region between the recess 31 and the main combustion chamber, instead of a thread a not shown conical or cylindrical neck can be arranged on the threaded socket 3". An associated hole in the cylinder head 19" is designed as a negative to the neck. There is also a possibility to form the ignition chamber 2" in registry to the cylinder head 19" especially thin-walled, so that small or no slots 32 at all are required.

Figure 6:
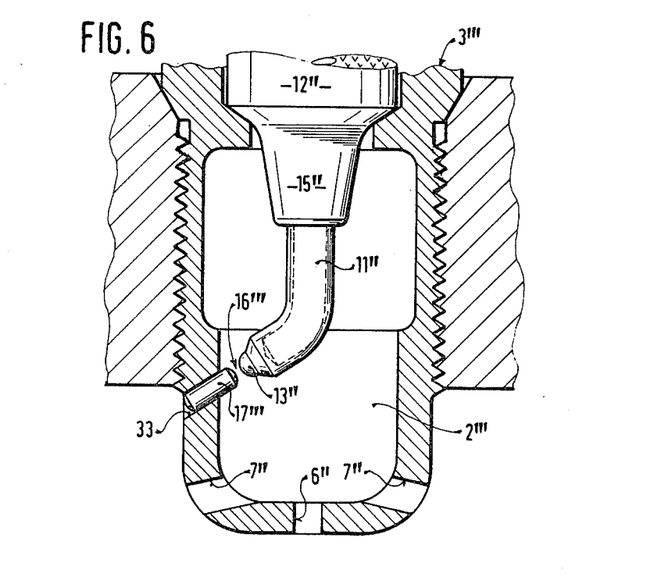
FIG. 6 is a view showing a longitudinal section of the ignition chamber in accordance with a further embodiment of the invention.

An ignition chamber 2''' in accordance with a further embodiment of the invention has a counterelectrode 17''' which is pin-shaped, and a center electrode 11''' from the previous embodiment. The counterelectrode 17''' is pressed in a hole 33 which is drilled in a threaded socket 3'''. The counterelectrode 17''' can be connected by soldering or welding with or without additional material in a known manner with the threaded socket 3'''. There is also a possibility to weld the counterelectrode 17''' flush in the threaded socket 3'''. The counterelectrode 17''' improves the supply stream of the fuel-air mixture to a spark gap 16''' which extends through the center electrode 11''' and cools the mixture after the ignition to only a small extent.

Figure 7:
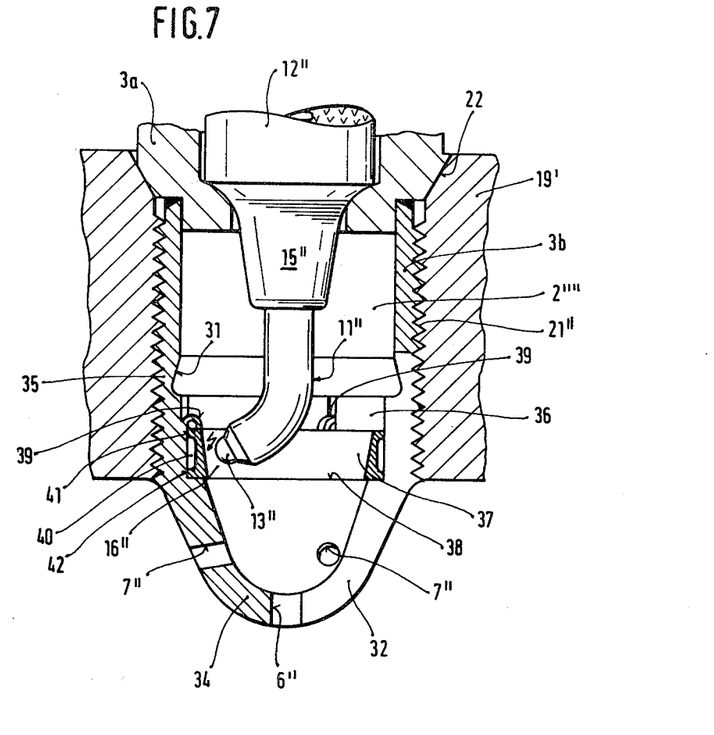
FIG. 7 is a view showing a longitudinal section of the ignition chamber in accordance with still a further embodiment of the invention.

In the ignition chamber shown in FIG. 7, a threaded socket composed of an upper part 3a and a lower part 3b has an ignition chamber 2'''' which is located inside the part 3b, an axial opening 6'''' and tangential opening 7'''', a center electrode 11'''' and an insulator 12''''. The center electrode 11'''' extends from an insulator shoe 15'''' which is formed on the insulator 12'''' and has a free end 13''''. The part 3b has at its periphery a thread 21''''. Substantially over half the length thereof the part 3b has a ring-shaped recess 31. The portion from the upper end of the recess 31 to the lower end 34 of the part 3b is determined so as to extend into a main combustion chamber of an internal combustion engine, and the part 3b is provided with slots 32 which extend advantageously in planes in which the longitudinal axis of the ignition chamber 2'''' is located. The recess 31 reduces the wall thickness of the part 3b and forms thereby an elastic hinge 35 for the region of the part 3b, which is located below the hinge 35 between the slots 32.

Below the ring-shaped recess, a receiving opening 35 is provided in the part 3b, and an expander ring 37 is inserted in this opening. In axial direction, the expander ring 37 is secured by a shoulder 38 adjacent to the receiving opening 36 and a nose 39. The expander ring 37 can also be soldered or welded by zones in the part 3b. It can be composed, for example, of the steel alloy with 20% of nickel. The part 30b can be composed of a steel alloy with 36% of nickel. Thereby when both parts 36 and 37 are heated by the same degrees, the heat with thermal expansion of the expander ring 37 is greater than that of the part 3b. The expander ring 37 can press against a cylinder head 19 of an internal combustion engine only selective zones of the part 3b which, for example, are subjected to stronger heat loading than other zones. In the above described case, these zones are the hinges 35 up to the end 34.

The expander ring 37 forms a ground electrode. Between the expander ring 37 and the free end 13'' of the center electrode 11'', a spark gap 16'' is formed. The parts 3a and 3b are inserted into one another and soldered or welded with one another.

The ignition chamber 2'''' is screwed into the cylinder head 19' of the internal combustion engine so that the lower end 34 extends into a not shown combustion chamber of the engine. The passages 6'' and 7'' communicate the main combustion engine with the ignition chamber 2''''. In the compressed stroke of the internal combustion engine, the fuel-air mixture to be ignited flows into the ignition chamber 2'''' and also flows into the spark gap 16''. In this spark gap 16'', the fuel-air mixture is ignited.

The cylinder head 19' is cooled in known manner by cooling air or cooling water. The inflamed mixture provides an especially fast heating of the part 3b and the expander ring 37 to a desired temperature, under the hinges 35. Heating of the expander ring 37 causes an increase of its outer diameter and an expansion of the part 3b. Additionally, during the energy conversion in the ignition chamber 2'''', an expansion takes place because of gas pressure. Thereby, there is provided below the hinges 35 between the thread course of the thread 21'' and the cylinder head 19' a strong contact with a predetermined loading of the internal combustion engine. Because of this, such quantity of heat energy is withdrawn from the part 3b to the cylinder head 19' that the temperature of the part 3b and the expander ring 37 does not exceed a preselected highest temperature. Since this contact is considerably increased by attaining of a predetermined loading of the internal combustion engine, the temperature region which varies within the working temperature of the ignition chamber 2'''' is very narrow.

The expansion of the expander ring 37 can be further improved when at least one groove-shaped recess 40 is arranged on its periphery. Thereby two peripheral faces 41 and 42 are formed on the expander ring, and both sides of these faces are jointly smaller than the height of the expander ring 37. The recess 40 serves for a partial heat insulation of the expander ring 37 relative to the part 3b, and a heat withdrawal from the expander ring 37 to the part 3b takes place predominantly via the faces 41 and 42. Thereby the expander ring 37 receives a considerably higher temperature than the part 3b. Because of this the expander ring 37 expands more to provide for an increased pressure of the threaded course of the part 3b against the cylinder head 19'. This produces a steeper regulating characteristic line and thereby a yet narrower temperature range within which the temperature changes during the operation of the internal combustion engine. The maximum temperature of the expander ring 37 is determined by the dimension of the recess 40. The latter is so dimensioned that the temperatures lies as close as possible below the uncontrolled ignition temperature for the mixture supplied into the ignition chamber. Advantageously, the region of the highest temperature is located in the region of the spark gap 16''.

Instead of the expander ring 37 formed as an insertable structural element, a not shown expander ring may be provided in the part 3a by forming an annular bead, a ring-shaped rib or the like.

Figure 8:
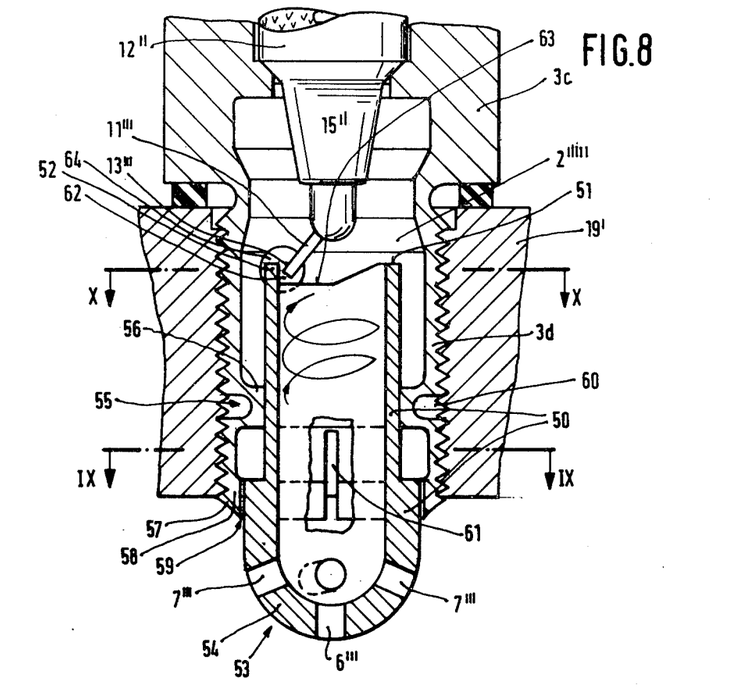
FIG. 8 is a view showing a longitudinal section of the ignition chamber in accordance with an additional embodiment of the present invention.
Figure 9:
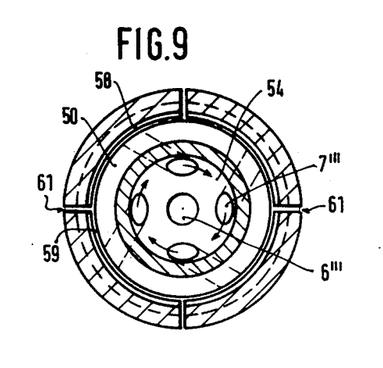
FIGS. 9 and 10 are views showing sections of the ignition chamber shown in FIG. 8.

In acccordance with a further embodiment shown in FIGS. 8 and 9, the ignition chamber 2'''' is provided, instead of the expander ring 37, with an expander pipe 50. An end 51 of the expander pipe 50 forms, in the region of the center electrode 11''', a ground electrode 52 by its free end 13'''. Another end 53 forms an ignition chamber end wall 54 in which an axially directed passage 6''' and several passages 7''' with tangential component are provided. The threaded socket 3c has a hollow threaded nut 3d which has at its outer periphery an annular groove 55 and at its height a ring-shaped closed collar 56. The expander pipe 50 is inserted into the collar 56 and fixed therein.

The expander pipe 50 and the collar 15 are, for example, welded and/or soldered with one another. A free end 57 of the threaded nut 3b, a further inwardly directed ring-shaped collar 58 is arranged. In condition of cold threaded nut 3d and cold expander pipe 50, an annular gap 59 takes place between the expander pipe 50 and the collar 58. The threaded nut 3d is slotted in the region between the free end 7 and the first ring-shaped closed collar 56, so that it is elastically expansible relative to a threaded hole 60 in the cylinder head 19 of the internal combustion engine. For example, three or more slots 61 which are located in planes parallel to the longitudinal axis of the expander pipe 50 are sawed in the threaded neck 3b.

During start-up of the internal combustion engine, the expander pipe 50 is heated. Below the collar 56 where the higher thermal loading takes place, the heating is fast, since there, because of the annular gap 59, no heat conducting contact to the threaded neck 3d is available. Prior to the part of the expander pipe 50 located below the collar reaching its allowable maximum temperature, the annular gap 50 changes because the expansion of the expander pipe 50 relative to the collar 58. Finally, the expander pipe 50 presses against the lower collar 58 and expands thereby the lower part of the threaded neck 3d so that the latter abuts against the wall of the threaded hole 60 located in the cooled cylinder head 19'. The lower part of the threaded neck 39 and the collar 58 form now a thermal bridge through which the heat is withdrawn from the expander pipe 50 to the cylinder head 19'. This heat withdrawal prevents in desirable manner a further temperature increase in the expander pipe 50. The expander pipe 50 can, as the expander ring 37 of the preceding embodiment, have a greater thermal expansion coefficient than the threaded neck 3d.

The passages 7'" provide, during a compression stroke of the internal combustion engine, along the inner periphery of the expander pipe 50, a whirling flow of fuel-air mixture, which rotates about the longitudinal axis of the pipe and is increasing. The whirling of the mixture finally reaches a spark gap 62 between the electrode 11'" and the end 51 of the expander pipe 57 as a ground electrode 62, and is ignited there. The end 51 has a recess 63 which is located, in direction of flow of the fuel-air mixture, behind the spark gap 62 relative to the ground electrode 52. The ignited mixture can unobjectionably expand through the recess 63 also transverse to the expander pipe 50 in the threaded neck 3d. It is thereby avoided that the expander pipe 50 with the freshly inflamed fuel-air mixture prevents the temperature increase desired for further flame generation and expansion and the complete burning. This construction of the ground electrode 52 with the subsequently arranged recess 63 can also be selected for spark plugs whose hollow threaded neck and center electrodes are different as compared with those described above.

Figure 10:
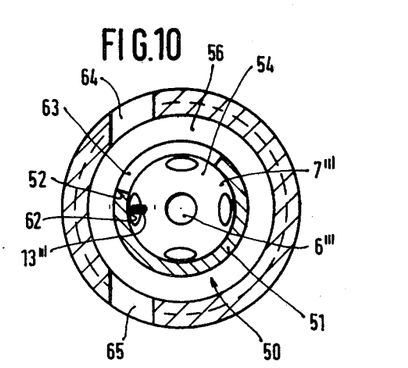

At the height of the free end 13'" of the center electrode 11'", an opening 64 directed toward the spark gap 62 is provided in the threaded neck 3d. The length of the spark gap 62 is measured by this opening 64 and is adjustable by bending of the center electrode 11'". A further opening 65 can be used for illumination of the spark gap 62 during measuring and bending or cleaning. The openings 64 and 65 can also serve for orientation during assembly of the individual parts 3d, 11'" and 50.

It will be understood that each of the elements described above, or two or more together, may also find a useful application in other types of constructions differing from the types described above.

While the invention has been illustrated and described as embodied in an internal combustion engine and an ignition chamber thereof, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An internal combustion engine, comprising means forming at least one main combustion chamber; means forming a separate ignition chamber separated from said main combustion chamber by a first wall and connected with said main combustion chamber by at least one passage in said wall; ignition means including a center electrode provided in said ignition chamber and forming together with said wall a spark gap, said center electrode having a free end which extends into said ignition chamber and being hollow near said free end and formed as a heat pipe; and an insulator with an insulator shoe which extends into said ignition chamber and supports said center electrode so that said insulator together with said insulator shoe forms an insulating gap.

2. An internal combustion engine as defined in claim 1, wherein said ignition chamber has a rear part, said insulator limiting said ignition chamber at a side opposite to said first wall, and said insulator shoe extending into said rear part of said ignition chamber.

3. An internal combustion engine as defined in claim 1, wherein said ignition chamber is elongated and has a central region as considered in direction of elongation, said electrode extending in said central region of said ignition chamber toward said first wall.

4. An internal combustion engine as defined in claim 1, wherein said electrode is hollow and formed as a heat pipe starting from said free end and in direction toward said insulator.

5. An ignition chamber unit to be arranged on a main combustion chamber of an internal combustion engine, comprising wall means bounding a separate ignition chamber and having a first wall which separates said ignition chamber from the main combustion chamber and has at least one passage arranged in said first wall to connect said ignition chamber with the combustion chamber; ignition means including a center electrode provided in said ignition chamber and forming together with said wall a spark gap, said center electrode having a free end which extends into said ignition chamber and being hollow near said free end and formed as a heat pipe; and an insulator with an insulator shoe which extends into said ignition chamber and supports said center electrode so that said insulator together with said insulator shoe forms an insulating gap.

6. An ignition chamber unit as defined in claim 5, wherein said electrode is hollow and formed as a heat pipe starting from said free end and in direction toward said insulator.

7. An ignition chamber unit as defined in claim 5, wherein said ignition chamber is elongated and has a central region as considered in direction of elongation, said electrode extending in said central region of said ignition chamber toward said first wall.

8. An ignition chamber unit as defined in claim 5, wherein said free end portion of said electrode is hollow and formed as a heat pipe starting from said free end and in direction toward said insulation.

9. An ignition chamber unit as defined in claim 5, wherein said spark gap has an axis, said electrode having a first portion which is formed as a heat pipe and a second portion extending in direction of the axis of said spark gap and adjacent to said spark gap, said second portion of said electrode having a narrower cross-section than said first portion.

10. An ignition chamber unit as defined in claim 9, wherein said ignition chamber has a longitudinal axis, said center electrode being straight and substantially concentric with said insulator, said spark gap extending substantially transverse to said longitudinal axis of said ignition chamber, said center electrode being wedge-shaped in direction toward said spark gap.

11. An ignition chamber unit as defined in claim 9, wherein said center electrode has one portion arranged substantially coaxially in said insulator, and another portion which is bent toward said spark gap.

12. An ignition chamber unit as defined in claim 11, wherein said center electrode has an end portion reducing in a conical manner.

13. An ignition chamber units as defined in claim 11, wherein said electrode has an end surface which is formed as an arch of a substantially semispherical shape.

14. An ignition chamber unit as defined in claim 5; and further comprising a counterelectrode, said electrode having an axis and an end portion which is offset in direction of said axis toward said insulator and also relative to said counter electrode.

15. An ignition chamber unit as defined in claim 14, wherein said center electrode has an end surface facing toward said spark gap and having a spherical shape.

16. An ignition chamber unit as defined in claim 5; and further comprising a counterelectrode associated with said center electrode and formed as a nose-shaped projection which extends into said ignition chamber.

17. An ignition chamber unit as defined in claim 5; and further comprising a counterelectrode associated with said center electrode and being pin-shaped.

18. An ignition chamber unit as defined in claim 5, wherein said wall means bounding said ignition chamber has a sealing surface and a thread to be screwed into the main combustion chamber.

19. An ignition chamber unit as defined in claim 18, wherein said wall means is formed as a spark plug.

20. An ignition chamber unit as defined in claim 18, wherein said thread in a region adjacent to the main combustion chamber has a pitch which is insignificantly smaller than that in a region adjacent to said sealing surface.

21. An ignition chamber unit as defined in claim 18, wherein said wall means includes a cylindrical neck located between said sealing face and said thread and having a length substantially corresponding to that of said thread.

22. An ignition chamber unit as defined in claim 21, wherein the internal combustion engine has a hole limited by a hole wall, said neck of said wall means having such a dimension that in cold condition there is a small distance between said neck and the hole wall, said distance takes place during increase of temperature in said ignition chamber, and upon attaining working temperature said neck abuts against the hole wall.

23. An ignition chamber unit as defined in claim 5, wherein the internal combustion engine has an engine wall, said wall means bounding said ignition chamber has a wall located adjacent to the main combustion chamber and being elastically expansible so that, when identical pressure takes place inside and outside said ignition chamber there is a distance between an outer surface of said expansible wall and the engine wall, and when a negative pressure takes place inside said ignition chamber said expansible wall abuts with its outer surface against the engine wall.

24. An ignition chamber unit as defined in claim 23, wherein said expansible wall of said ignition chamber is provided at least in some zones of the latter.

25. An ignition chamber unit as defined in claim 23, wherein said wall means bounding said ignition chamber has at least one slot provided in said elastically expansible wall.

26. An ignition chamber unit as defined in claim 25; and further comprising an expander ring arranged inside said ignition chamber and in heated condition of said ignition chamber expanding said expansible wall relative to the engine wall.

27. An ignition chamber unit as defined in claim 26, wherein said expander ring is composed of a material having a thermal expansion coefficient which is greater than that of said expansible wall.

28. An ignition chamber unit as defined in claim 26, wherein said expander ring has a peripheral surface facing toward said expansible wall and being smaller than the height of said expander ring.

29. An ignition chamber unit as defined in claim 26, wherein said expander ring is formed as a ground electrode.

30. An ignition chamber unit as defined in claim 26, wherein said expander ring is inserted into said wall means bounding said ignition chamber and secured from its axial displacement.

31. An ignition chamber unit as defined in claim 5, wherein said wall means bounding said ignition chamber has a hollow threaded neck which is elastically expansible over at least a part of its length and is provided with a holder holding said insulator, and an expander pipe inserted into said threaded neck and having an open free end facing toward the insulator and an end wall forming said first wall provided with said passage.

32. An ignition chamber unit as defined in claim 31, wherein the internal combustion engine has a cylinder head with a threaded engine hole, said threaded neck and said expander pipe being arranged so that in cold condition said expander pipe has in zones a distance from said threaded neck, which reduces by increasing heating during the operation of the internal combustion engine, so that finally said threaded neck elastically expands and increasingly stronger abuts against a wall of the threaded engine hole.

33. An ignition chamber unit as defined in claim 31, wherein said elastically expansible part of said threaded neck has at least one expansion slot.

34. An ignition chamber unit as defined in claim 33, wherein said threaded neck has a longitudinal axis and a free end, said elastically expansible part of said threaded neck has a plurality of such expansion slots provided in planes extending in said longitudinal axis and starting from said free end of said threaded neck.

35. An ignition chamber unit as defined in claim 34, said threaded neck having thin-walled zones formed as elastic hinges, said expansion slots ending in said thin-walled zones.

36. An ignition chamber unit as defined in claim 32, wherein said threaded neck has a free end, said wall means including at least one collar provided at the height of said free end of said threaded neck between the latter and said expander pipe and arranged so that during expansion of said expander pipe said collar transmits forces substantially in a radial direction to said threaded neck.

37. An ignition chamber unit as defined in claim 36, wherein said wall means further has a further collar arranged between said free end of said threaded neck and said open end of said expander pipe, so that said expander pipe is supported by said threaded neck via said further collar.

38. An ignition chamber unit as defined in claim 37, wherein said threaded member is connected with said expander pipe, and further comprising means for connecting said threaded neck with said expander pipe.

39. An ignition chamber unit as defined in claim 38, wherein said means for connecting said threaded neck with said expander pipe is welding means.

40. An ignition chamber unit as defined in claim 38, wherein said connecting means for connecting said threaded neck with said expander pipe is soldering means.

41. An ignition chamber unit as defined in claim 31, wherein said expander pipe has a free end portion which extends freely in said ignition chamber and forms a ground electrode.

42. An ignition chamber unit as defined in claim 41, wherein said first wall has a plurality of such passages, some of said passages extending substantially tangentially and in an identical angular direction relative to said expander pipe, said ground electrode facing toward said insulator, said expander pipe having a recess provided behind said passages as considered in the angular direction, said center electrode being bendable relative to said ground electrode, and said threaded neck having at least one opening provided at the height of said recess and facing toward said electrodes.

* * * * *